United States Patent [19]

Mazzola et al.

[11] 4,444,832

[45] Apr. 24, 1984

[54] PROCESS FOR OBTAINING REINFORCED CELLULAR MATERIALS BASED ON UNSATURATED POLYESTER RESINS

[75] Inventors: Massimo Mazzola, Segni; Aldo Cipriani, Colleferro; Giancarlo Carignani, Rome, all of Italy

[73] Assignee: Snia Viscosa S.p.A. - Societa' Nazionale Industria Applicazioni Viscosa, Milan, Italy

[21] Appl. No.: 380,129

[22] Filed: May 20, 1982

Related U.S. Application Data

[63] Continuation-in-part of Ser. No. 351,309, Feb. 22, 1982, abandoned, which is a continuation of Ser. No. 145,354, Apr. 30, 1980, abandoned.

[51] Int. Cl.³ .............................................. B29D 27/00
[52] U.S. Cl. ..................................... 428/290; 264/45.3; 264/46.7; 264/50; 264/53; 264/257; 264/328.6; 264/DIG. 5; 521/81; 521/138
[58] Field of Search ............... 264/45.3, 50, 46.5, 264/46.7, DIG. 83, 257, 328.6, 53, DIG. 5; 521/81, 138; 428/290

[56] References Cited

U.S. PATENT DOCUMENTS 3,896,060 7/1975 Plunguian et al. ............... 264/50 X
4,026,828 5/1977 Smiley ........................... 264/45.3 X
4,119,583 10/1978 Filip et al. ..................... 264/46.5 X
4,148,854 4/1979 Cordts et al. ................... 264/45.3

OTHER PUBLICATIONS

Kubiak, Richard S. and Robert C. Harper "The Development of Non-Urethane Materials for the RIM Process", In *45th Annual Technical Conference, 1980, Reinforced Plastics/Composites Institute, The Society of the Plastics Industry, Inc.*, Section 22C, pp. 1–7.

Primary Examiner—Philip E. Anderson
Attorney, Agent, or Firm—Hubbell, Cohen, Stiefel & Gross

[57] ABSTRACT

A process for obtaining cellular materials from unsaturated polyester resins reinforced with fillers having a density below 0.7 kg/lt by injecting a liquid foam, made from the resins by mechanical introduction of a gas therein into a closed mold, is described. The liquid foam, obtained from polyester resins including additives and optionally a reinforcement of synthetic, artificial, vegetable or mineral fibres having a length lower than 5 mm, and optionally containing a low boiling foaming agent, is injected voluminized and cross-linked in the hot or in the cold in a closed mold containing a reinforcing agent of synthetic, artificial, vegetable or mineral fibers as a monofilament mat, a cut fibre mat, a mono or bidirectional roving woven mat, rovings, fabrics.

13 Claims, 1 Drawing Figure

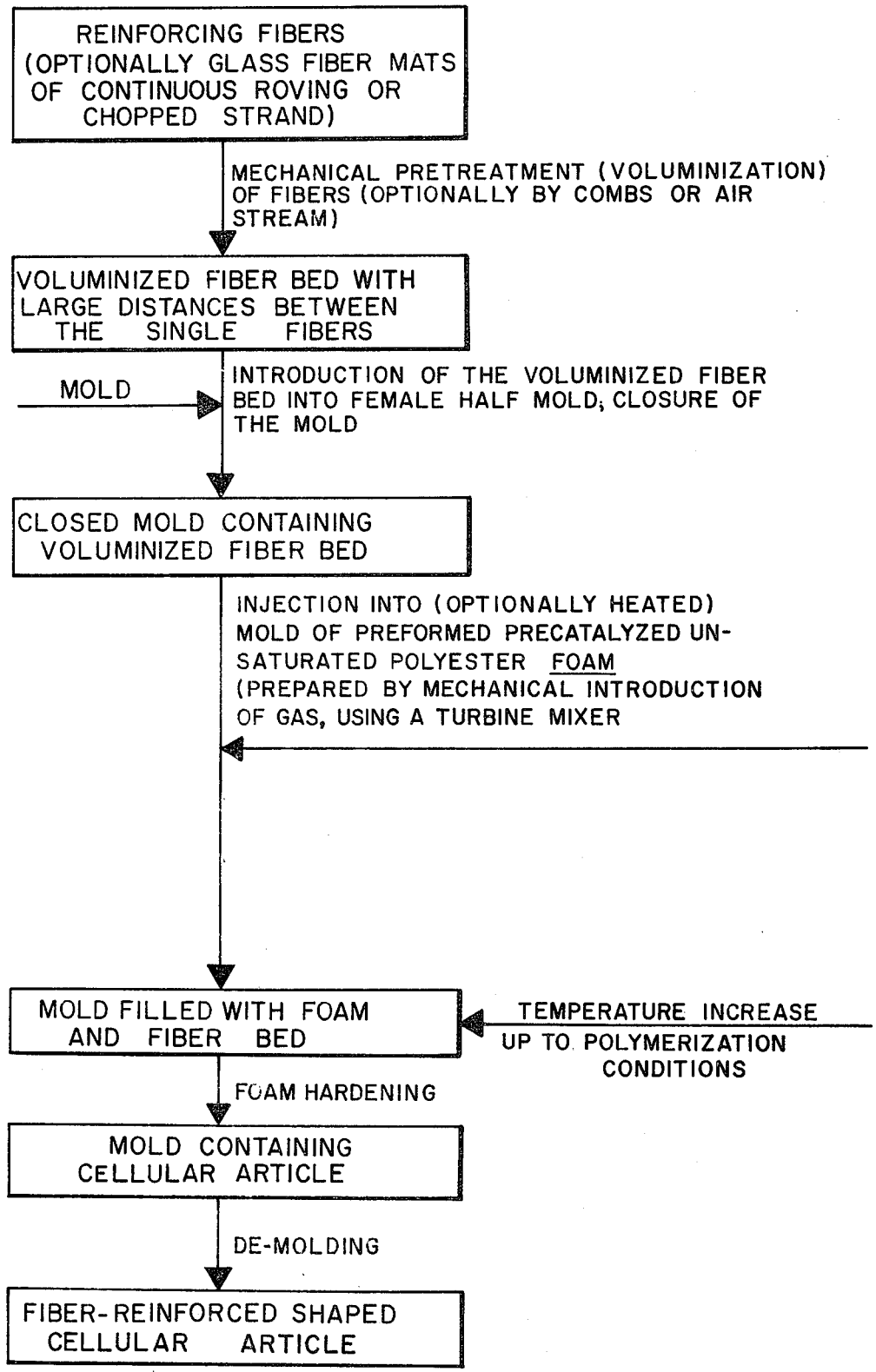

PROCESS FOR OBTAINING REINFORCED CELLULAR MATERIALS BASED ON UNSATURATED POLYESTER RESINS

The present application is a continuation in part of the copending application Ser. No. 351,309, filed on Feb. 22, 1982, now abandoned which is a continuation of application Ser. No. 145,354 of the same Applicant, filed on Apr. 30, 1980 now abandoned.

BACKGROUND OF THE INVENTION

The present invention refers to a process for making reinforced cellular materials from unsaturated polyester resins by injecting a liquid foam, made from said resins by mechanical introduction of a gas therein, into a closed molded containing the reinforcing materials which will be hereinafter specified.

The present invention also refers to the cellular materials thus obtained, as well as to the products made from said cellular materials.

Molded cellular materials of reinforced unsaturated polyester resins are known. Said materials however are obtained by impregnating the reinforcing material with an unsaturated polyester resin in liquid form, which resin is successively chemically expanded in the mold. Said process however has the following disadvantages:
- the chemicals employed as foaming agents are usually toxic and further are generally unstable at room temperature and therefore must be maintained at low temperatures until their use;
- the process is not economical since the chemical foaming agent is expensive;
- the process requires molds suitably reinforced to stand the pressure produced during the expansion of the liquid resin.

A method for overcoming these disadvantages has been proposed in the art. It consists in carrying out the foaming by mechanical incorporation of the gas into the liquid resin. This method however does not permit to incorporate a reinforcing material having a length greater than 1.5 mm before the foaming stage, inasmuch as the mechanical devices for gas dispersion (nozzles and turbines) do not permit the passage of larger reinforcing materials and further such materials also cause a partial degradation of the foam.

A method for overcoming this last difficulty has also been proposed, which consists in separately preparing the foam by mechanical means and injecting it in liquid form into a closed mold in which a bed of dry fibres has been previously placed, which fibres are constituted by a mat of glass fibres cut and disposed over the entire cross-section of the mold or fixed on the two halves of the mold.

However, not even this method is free from disadvantages. Some of the disadvantages are:
(1) the styrene contained in the liquid resin dissolves the binder which keeps the mat together; (2) the entering flow of foam removes the glass fibres; (3) in the case of a mold containing the reinforcement in the form of a mat of glass fibres which are cut and disposed over all the cross-section of the mold, said reinforcement does not permit the foam to pass through without breaking it.

SUMMARY OF THE INVENTION

The Applicant has now surprisingly found a method for producing cellular materials from unsaturated polyester resins, reinforced with reinforcing fillers and having a density lower than 0.7 kg/lt, whereby said disadvantages are overcome.

An object of the present invention is therefore a process for obtaining cellular materials from unsaturated polyester resins, reinforced with reinforcing loads, having a density lower than 0.7 kg/lt, by injection into a closed mold, of a liquid foam of said resins, obtained by mechanical introduction of a gas, characterized by the fact that the liquid foam made of unsaturated polyester resins which contains conventional additives, optionally containing a reinforcement of mineral or organic fibres having a length lower than 5 mm, preferably less than 3 mm and more preferably less than 1.5 mm, and optionally containing a low boiling foaming agent, is injected and subsequently cross-linked in a closed mold containing a reinforcing agent of synthetic, artificial, vegetable or mineral fibres in the form of a monofilament mat, a cut fibre mat, a mono- or bidirectional roving mat, rovings, fabrics or the like.

In the case that a cut fibre mat is used, it is convenient to use a product containing a binder which has a low solubility in styrene, so as to avoid its being washed away and the consequent displacement of the fibres.

Preferably glass fibres are used as reinforcing material.

The reinforced cellular material made of unsaturated polyester resins thus obtained, is also an object of the present invention. Said cellular material preferably has a percentage of closed cells above 80%.

The drawing shows a flow diagram of the process of the present invention.

DETAILED DESCRIPTION OF THE PREFERRED EMBODIMENT

If the monofilament mat is employed as reinforcing agent in the mold, a cellular material is obtained which is uniformly reinforced along all its thickness, viz. the fibres are uniformly and homogeneously distributed through the entire body of the product.

In the case that a woven mat, rovings or fabrics are used as reinforcing fillers in the mold, a cellular material is obtained which is uniformly reinforced over all its surface in a stable way.

Unlike the behaviour of foams which are produced directly in the mold in the presence of glass fiber beds where no problems concerning foams stability arise, big problems of foams stability arise in the case of preformed foams which are injected into a mold containing glass fiber beds. This is particularly evidenced in preformed polyester foams. Preformed polyester foams easily collapse with separation of the gas bubbles from resin when penetrating through a conventional glass fiber mat or fabric. We have found that this is connected with the type of glass fiber bed, its apparent volume, and the distance between the single glass fibers. If the glass bed is of a too compact type having low apparent volume and the distance between the single glass fibers is too small, preformed polyester foam generally collapses during the penetration of the foam through the bed. We have found that this does not happen for foams produced from liquid resins in the presence of glass fibers since in this case the gas bubbles reach their maximum dimensions at the end of the penetration period through the glass bed, and because such systems are stable since the gas bubbles are nascent.

In the present case of preformed polyester foam injected into a mold containing glass fiber beds the following criteria must be observed:

1: the quantity of glass fibers should be limited to about 0.2 g per cm³ of the mold volume;
2: the glass mats or fabrics should be voluminized in order to decrease their apparent density, e.g. by a mechanical device, like combs, or by an air stream;
3: the distance between the single glass fibers should prevailingly be equal or exceed 0.045 cm.

If these critical parameters are not observed the preformed foam will collapse during its penetration through the glass beds and no homogeneous cellular material will be obtained after cross-linking of the resin. If these critical parameters are observed one obtains cellular materials having homogeneous distribution of the cells and of the glass fibers and homogeneous cell dimensions.

The cross-linking in the mold may be carried out, according to the present invention, both in the hot and in the cold, preferably between 20° and 80° C.

The percentage of reinforcing material is preferably between 5 and 50% by weight with respect to the unsaturated polyester resin.

If glass fibres are used as the reinforcing agent in the mold, the fibres have a diameter which is smaller than 16 micron. If other synthetic, artificial, vegetable or mineral fibres, such as e.g. aramide, carbon, cellulose ester, polyethyleneterephthalate, acrylic, or regenerated cellulose fibres are used as reinforcing material, the fibres have a count lower than 20 deniers.

The liquid unsaturated polyester resin foam, optionally containing the low boiling liquid agent and/or the reinforcing fibres having the aforesaid lengths, is conveniently obtained in a foaming machine constituted by a turbine having numerous ranks of vanes having a peripheral speed of 200–500 m/min, said turbine being heated by means of suitable jackets and each row being separated from the following one by crowns of pegs fixed on the jacket of the turbine itself.

When a low boiling liquid agent and/or fibres of the reinforcing material hereinbefore specified are used, a stirrer-mixer is conveniently inserted before the turbine, in which stirrer-mixer the solution of unsaturated polyester resin and styrene, containing suitable additives, is mixed with the low boiling liquid agent and/or the fibres of reinforcing material.

A fluid (preferably nitrogen or air) which constitutes the foaming agent is also introduced into said turbine at an appropriate pressure. The catalyst is introduced at the last row of the turbine, wherein the foam has already been created, in such a way that the foam which flows out of the turbine already contains the catalyst.

The injection of the liquid foam is conveniently effected by using a pressurized vessel exploiting the inner pressure of the vessel and controlling the minimum and maximum levels according to conventional methods.

The closed mold (constituted by at least two halves), into which the liquid foam is injected, may be of metal or of a composite material, and in any case do not require any particular strength, contrary to what occurs when foams are made by chemical expansion of the resin where the high pressures which are reached require especially high resistance and rigidity of the mold.

It is therefore apparent that the present invention is economically convenient, since stronger molds are much more expensive.

If catalytic systems which operate in the hot are used, the molds may be heated, whereby advantages are obtained as to polymerization times and surface finish of the products. Before the injection, if synthetic or artificial, vegetable or mineral fibres having a length higher than 1.5 mm, such as monofilament mat, cut fibre mat, woven mat, roving, mono- and bidirectional fabrics, etc. are used, said reinforcement fibres, in the dry state, are preferably previously positioned in the molds.

The appropriately catalyzed liquid foam introduced into the mold, wets the fibres positioned therein at the moment of its injection without changing their disposition in the mold, and subsequently polymerizes.

The polymerization reaction may be initiated either in the cold or in the hot, depending on the catalytic system employed and on the purposes which are to be attained. The expression "unsaturated polyester resins" is to be construed, according to the present invention, as meaning the resins obtained from an unsaturated polyester, formed by polycondensation of at least one $\alpha$-$\omega$ ethylenically unsaturated dicarboxylic acid and/or at least one corresponding anhydride with at least one polyvalent alcohol, and one or more ethylenically unsaturated monomers, such as styrene, vinyltoluene, $\alpha$-methylstyrene, methylmethacrylate, diallylphthalate, etc.

Examples of ethylenically unsaturated dicarboxylic acids or corresponding anhydrides comprise maleic acid or its anhydride, fumaric, itaconic and mesaconic acids.

Together with the unsaturated dicarboxylic acids there may be employed mono or polyfunctional aliphatic, saturated carboxylic acids such as adipic, succinic, glutaric acid and the like; mono or polyfunctional aromatic carboxylic acids such as phthalic, isophthalic, terephthalic, benzoic acids etc.; anhydrides such as phthalic, trimellitic anhydride etc.

As polyvalent alcohols there may be employed: ethylene glycol, propylene glycol, 1,2-butanediol, diethylene glycol, dipropylene glycol, 1,6-hexanediol, 1,4-cyclohexanedimethanol, trimethylolpropane, pentaerythrite, glycerine, neopentylglycol, etc.

The unsaturated polyester resins may be prepared by the known processes used for the polyester resins, both in solvent and in dry phase.

According to a practical preferred embodiment of the present invention, the unsaturated polyester resin is obtained by reacting from 1 to 1.3 mols of at least one polyvalent alcohol with from 0.05 to 1 mol of at least one ethylenically unsaturated dicarboxylic acid or corresponding anhydride. The polycondensation is continued until a polymer is obtained having an acid number comprised between 5 and 90 mg of KOH/g. The preferred acid number is comprised between 10 and 30 mg of KOH/g and the molecular weight between 500 and 5000.

Besides the ethylenically unsaturated dicarboxylic acid or correspondent anhydrides, a saturated dicarboxylic acid may be present in the mixture, in a molar amount comprising between 5 and 95% with respect to the unsaturated dicarboxylic acid, according to the known art.

The unsaturated polyester thus obtained is mixed with styrene, in a polyester/styrene ratio comprising between 9:1 and 1:1 preferably between 4:1 and 2.5:1.

Inhibitors and stabilizers adapted to prevent the premature cross-linking of the mixture may be added to the styrene/unsaturated polyester mixture, in amounts from 0.1 ppm to 10000 ppm.

The most commonly used inhibitors and stabilizers are: hydroquinone, quinone, quinhydrone, tertiary butylpyrocatechol, toluene hydroquinone, monotertiary butylhydroquinone, ditertiary butylhydroquinone, 1,4-naphthoquinone, anthraquinone, methyl and/or ethyl ethers of hydroquinone, picric acid, trinitrobenzene, paraphenylenediamine, etc.

Further, in order to improve the stability of the resin, organic or inorganic compounds soluble in the polyester, quaternary ammonium salts, etc., are added.

In order to improve the stability of the foam, additives are added to the unsaturated polyester resin before foaming, such as e.g. surface active agents for improving the formation of the foam and/or agents for regulating the diameter of the gas bubbles and/or agents for stabilizing the foams, e.g. surface active agents based on silicone compounds, block copolymers of silicones with polyethers, soaps such as ricinooleates, polymercaptanes, etc.

Any compound or mixtures of compounds which generate free radicals under the particular conditions of the polymerization may be used as a catalytic system.

These compounds are: the peroxides or the hydroperoxides, such as diacetyl peroxide, benzoyl peroxide, hydrogen peroxide, cumene hydroperoxide, methylethylketone peroxide, etc. Other catalysts which generate free radicals may also be used such as ammonium persulphate, perborates and percarbonates.

It is preferred to employ, in addition to the free radical generating catalyst, an accelerator which increases the speed of decomposition of the peroxidic compounds, which thus produces free radicals at higher speeds. Cobalt naphthenate is generally used as the accelerator and is diluted in styrene until it is brought to a concentration of about 1–3% of metal.

A complexing agent for increasing the efficiency of the accelerator may also be used. According to a widely accepted interpretation, it is believed that such agents act to reduce the cobalt naphthenate which is transformed into the corresponding cobaltous compound which is much more reactive.

Generally tertiary aromatic amines, among which preferably dimethylaniline, are used as complexing agents.

Wide variations and changes may be effected in the details of the embodiment of the present invention without departing from the spirit and the scope of the present invention.

In order better to illustrate the inventive concept of the present invention reference is made to the flow diagram of the process, and the way of carrying it into practice, some non limitative examples are described.

EXAMPLE 1

100 kg of polyester resin are introduced into a steel vessel, which resin has been prepared by reacting the following components according to the following molar ratios: propylene glycol 0.8 mols, diethylene glycol 0.2 mols, maleic anhydride 0.6 mols, phthalic anhydride 0.4 mols, hydroquinone 100 ppm, styrene 30% of the total.

500 ml of cobalt octoate having a concentration of 6% in xylene, 1 kg of silicone oil, 5 kg of glass milled fibres having a nominal length of 1 mm are added to the aforesaid resin. The whole is mixed with a helical stirrer for 20 minutes. Said mixture is transferred from the vessel to a turbine thermostatized at 35° C., with the help of a gear pump having a flow rate of 200 lt/h. The aforesaid turbine is constituted by a stator and a rotor provided with projections having a circular cross-section. The peripheral speed of the rotor is 250 m/min.

The foaming gas (air) is injected into the turbine through a nozzle. The catalyst, methylethylketone peroxide, is injected at a flow rate of 1.6 lt/h before the exit of the foam from the said turbine.

The liquid foam thus formed is poured into a vessel adapted to be pressurized. Once it has been filled, the vessel is pressurized and the liquid foam is injected through a suitable pipeline into a steel mold heated at the temperature of 60° C. A monofilament mat with a weight of 600 g/m$^2$ has been previously positioned in the mold. The cross-linking is allowed to occur, and it occurs without development of heat.

Once polymerized, the cellular material thus obtained is extracted from the mold. It has the following characteristics:

| | |
|---|---|
| Density | 0.43 kg/lt |
| Tensile strength | 128 kg/cm$^2$ |
| Tensile modulus | 14000 kg/cm$^2$ |
| Elongation at break | 1.44% |
| Resistance to shear | 56 kg/cm$^2$ |
| Shear modulus | 1070 kg/cm$^2$ |
| Minimum height from which a steel ball of 5 kg must fall to break a sample | 300 cm |
| Thermal conductivity | 0.031 Kcal/m h °C. |

EXAMPLE 2

The operations are carried out as in Example 1 except that the hardening system is modified inasmuch as methylethylketone peroxide is still used but in a percentage of 1.2% of the resin which is further accelerated with dimethylaniline in an amount of 0.1% of the resin. Further, in this case the mold is not preheated and the injection occurs at room temperature.

The characteristics of the cellular material obtained are substantially the same as those of Example 1.

EXAMPLE 3

In this example a plane rectangular plate of cellular material reinforced with glass fibers is produced, the product having the following dimensions:

length of 100 cm, width of 50 cm and thickness of 0.5 cm.

A mold comprising two half-molds, is open and its surfaces are treated with a commercial silicone based releasing agent. Then, 450 g (dry weight) of glass fiber mat layers are positioned in the mold, the glass fibers having an average diameter of 10 microns. The glass fiber mat layers are voluminized by means of an air stream, until they assume an overall thickness of 0.5 cm and thus occupy the whole volume of the mold. In this way the passage distances obtained between the fibers are prevailingly equal or superior to 0.05 cm.

The mold is then closed and the liquid foam obtained according to example 1 but not containing glass fibers is injected by means of a pump into the mold pre-heated to 60° C., until it occupies the entire volume of the mold. The temperature of 60° C. is maintained until the hardening of the resin is completed.

Once polymerized the finished cellular material plate is extracted from the mold. It has a density of 0.41 kg/l.

An inspection of a cross-sectional cut in the product reveals a homogeneous cellular structure throughout the cross-sectional surface, with cells having homogeneous diameter.

EXAMPLE 4 (comparison example)

The same mold of Example 3 is used and again 450 g of glass fiber mat layers are introduced into it. The glass fiber mat is identical to that used in Example 3. This time, however, the glass fibers are positioned in a conventional manner without use of an air stream, thus without voluminization.

In this way the reinforcing fiber layer has a thickness of about 0.3 cm and the passage distances between the single glass fibers are prevailingly equal or inferior to 0.03 cm.

The mold is closed and into the closed mold the same amount of the same liquid foam as in Example 3 is injected.

The cross-linking is allowed to occur in the same conditions as in Example 3.

After polymerization a very unhomogeneous product is extracted from the mold, mostly composed of compact unfoamed material and of large gas bubbles.

The inspection of the cross-section of the product reveals mostly compact material, some large gas bubbles and agglomerates of glass fibers with a small amount of hardened resin. The finished product does not have cellular structure.

We claim:

1. A method of producing reinforced cellular materials based on unsaturated polyester resins, said method comprising (1) injecting a fully mechanically preformed liquid foam of said polyester resin, obtained essentially by mechanical introduction of gas into said resin, into a closed mold containing reinforcing fibres, said fibers being voluminized to such an extent as to have in the mold not more than about 0.2 g of reinforcing fibers per cm$^3$ of mold volume, the distance between the individual fibers being at least about 0.045 cm; and (2) subsequently cross-linking said foam in the mold, whereby a reinforced cellular material having a density of less than about 0.7 kg/l is obtained.

2. A method according to claim 1, wherein said reinforcing fibers are either synthetic, vegetable, or mineral fibers.

3. A method according to claim 2, wherein said synthetic, vegetable, or mineral fibers are in the form of either a monofilament mat, a cut fiber mat, a monodirectional roving mat, a bidirectional roving mat, rovings, or fabrics.

4. A method according to claim 1, wherein said preformed foam contains reinforcing materials.

5. A method according to claim 4, wherein said reinforcing material is either synthetic, vegetable, or mineral fibers.

6. A method according to claim 5, wherein said reinforcing material has a length of less than about 3 mm.

7. A method according to claim 5, wherein said reinforcing material has a length of less than about 1.5 mm.

8. A method according to claim 1, wherein said cross-linking is carried out in the mold at a temperature from about 20° C. to about 80° C.

9. A method according to either claim 1 or 4, wherein said reinforcing material is present in an amount of from about 5 to 50 percent by weight with respect to the unsaturated polyester resin.

10. A method according to claim 1, wherein glass fibers having a diameter less than about 16 microns are employed as said reinforcing material in the mold.

11. A process according to claim 1, wherein said preformed liquid foam is introduced into a pressure vessel and thereafter injected into said closed mold by means of the pressure within said pressure vessel.

12. A cellular reinforced material of unsaturated polyester resin, produced by the process according to claim 1.

13. The reinforced cellular material according to claim 12, wherein said reinforced cellular material has a percentage of closed cells above 80 percent.

* * * * *